United States Patent
Weber

(10) Patent No.: US 7,856,873 B2
(45) Date of Patent: Dec. 28, 2010

(54) APPARATUS FOR REDUCING THE FRICTION BETWEEN TWO BODIES

(75) Inventor: Philipp Weber, Rueti (CH)

(73) Assignee: Hch. Kuendig & Cie. AG, Rueti (CH)

( * ) Notice: Subject to any disclaimer, the term of this patent is extended or adjusted under 35 U.S.C. 154(b) by 560 days.

(21) Appl. No.: 11/978,813

(22) Filed: Oct. 29, 2007

(65) Prior Publication Data
US 2008/0105027 A1 May 8, 2008

(30) Foreign Application Priority Data
Nov. 2, 2006 (EP) .................................. 06405461

(51) Int. Cl.
*G01L 5/04* (2006.01)
(52) U.S. Cl. ......................................................... 73/159
(58) Field of Classification Search ........................ None
See application file for complete search history.

(56) References Cited

U.S. PATENT DOCUMENTS 3,818,327 A * 6/1974 Alexander .................. 324/231
3,973,122 A * 8/1976 Goldberg .................. 250/338.1
6,125,589 A 10/2000 Kramer
6,519,221 B1 * 2/2003 Manalis et al. .............. 369/126
2006/0182930 A1 * 8/2006 Kawakami et al. .......... 428/141

FOREIGN PATENT DOCUMENTS

| DE | 195 11 939 A1 | 10/1996 |
|---|---|---|
| EP | 0 740 225 A2 | 10/1996 |
| JP | 51400954 A | 8/1979 |
| JP | 1134734 A | 12/1999 |

\* cited by examiner

*Primary Examiner*—Robert R Raevis
(74) *Attorney, Agent, or Firm*—Townsend and Townsend and Crew, LLP

(57) ABSTRACT

The apparatus is suited to reduce the friction between two bodies (1, 2) moving relative to each other. The two bodies (1, 2), which move relative to each other, can contact each other constantly or occasionally or have a small distance from one another of, for example, up to one millimeter. The distance can vary. With the relative movement of both bodies (1, 2), for example, the one body can be a sensor (1) which is firmly installed, and the second body can be a foil (2), which moves with considerably constant speed. The device has a vibration device (3, 4, 5, 6) for vibrating at least one of the bodies (1, 2). The vibration movements of the vibrated bodies can have any pattern.

9 Claims, 1 Drawing Sheet

APPARATUS FOR REDUCING THE FRICTION BETWEEN TWO BODIES

CROSS-REFERENCES TO RELATED APPLICATIONS

This application claims the priority of European Application No. 06405461.2, filed on Nov. 2, 2006, the disclosure of which is incorporated herein by reference.

BACKGROUND OF THE INVENTION

The invention relates to an apparatus for reducing the friction between two bodies and, in particular, for reducing the friction between the sensor and the object to be measured of a thickness measuring apparatus.

In previous designs for reducing the friction, thickness sensors for plastic foils, for example, are coated with materials which glide well on these foils (e.g. PTFE, i.e., polytetrafluoroethylene, and/or Teflon™), are executed as rolling thickness sensors (EP 01182423) or an air pocket is built up between the sensor and object to be measured (UK 1 436 698).

For measuring the thickness of foils on which bodies such as sensors glide very poorly, so-called matte foils or foils which are even sticky, for example, with EVA (ethylene vinyl acetate) in the outer layer contacting the sensor, a surface coating with almost ideal gliding material (e.g. PTFE) is also not sufficient. Rolling thickness sensors and extreme contact-sensitive thickness sensors with air cushions are complicated in construction and are distance-sensitive.

The thickness measurement of plastic foils for blown foil lines is carried out for procedural reasons, for flat foil lines for cost reasons ideally with a reflective measuring operation. Known measuring methods are those which function, for example, capacitively, optically or with ionizing radiation.

In all of these measuring methods the distance to the object to be measured has a certain influence on the measuring precision. The contacting measurement operation (distance 0) would be metrologically optimal. In certain limits the distance from sensor to foil can be measured and the measurement signals can be arithmetically compensated by computation (mathematically) (EP0801290, EP1681531).

SUMMARY OF THE INVENTION

An object of the present invention is to reduce the friction between two bodies which are in contact with each other or only a slight distance of one millimeter at most exists between them e.g. between the sensor surface and the object to be measured such that very matte foils contacting (distance 0) or almost contacting (distance almost 0) can be measured.

This object is solved according to the invention with an apparatus having a vibration device for vibrating at least one of the bodies. The vibration movements of the vibrated body can have any pattern. Further, the invention relates to a device for manufacturing plastic foils with such an apparatus.

The vibration movements can be carried out in all three dimensions, transversely, rotating, wobbling or also combined. The lift, the frequency, angle of rotation and the movement pattern, e.g. rectangle, saw tooth or sinus of the vibration, have a decisive influence on the reduction of the friction.

The vibration can, for example, be generated by means of piezo actors, drive with an electromagnetic alternating field or with an imbalance at a rotating part.

The invention will be explained in more detail on the basis of both drawings, which schematically show an example of a measuring apparatus at a plastic blown foil.

DESCRIPTION OF THE PREFERRED EMBODIMENTS

Figure 1:
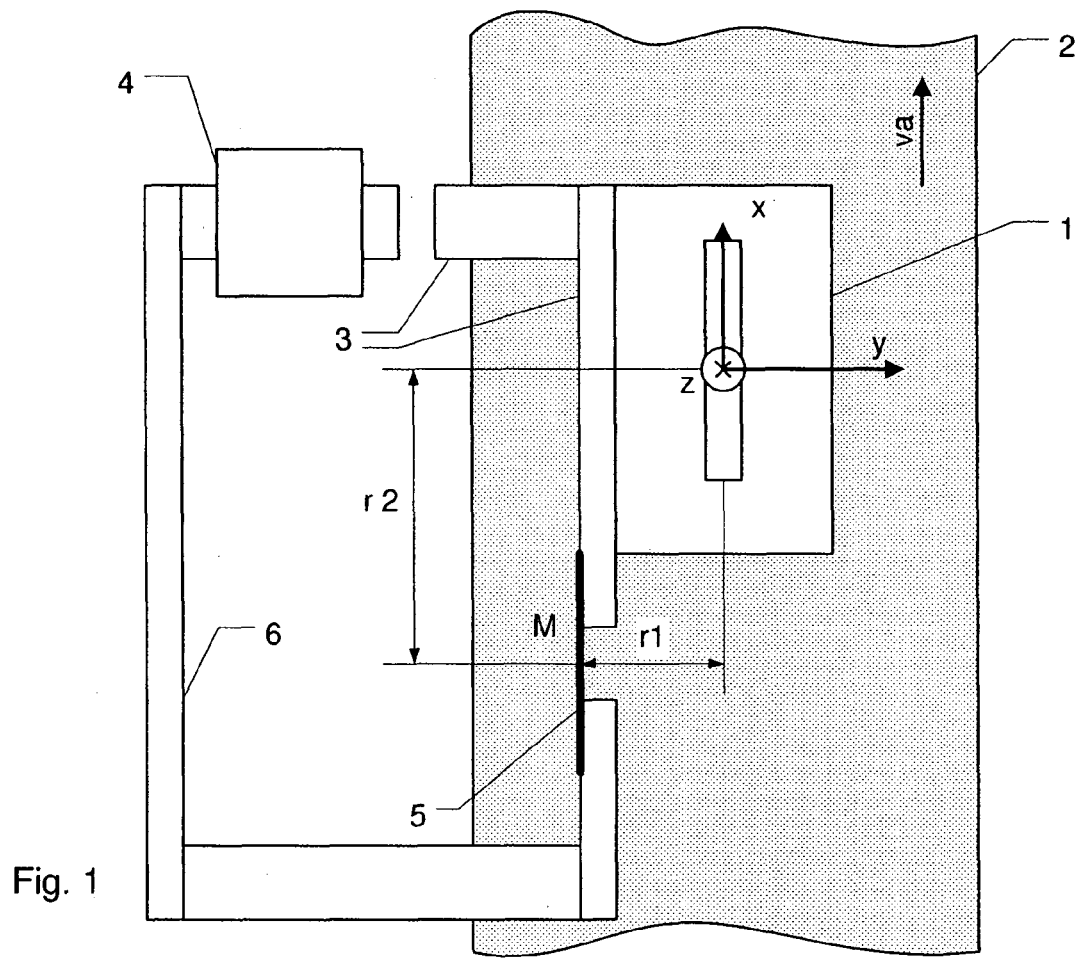
FIG. 1 shows a schematic front view of the thickness measuring device at the blown film of an apparatus for manufacturing plastic foils.
Figure 2:
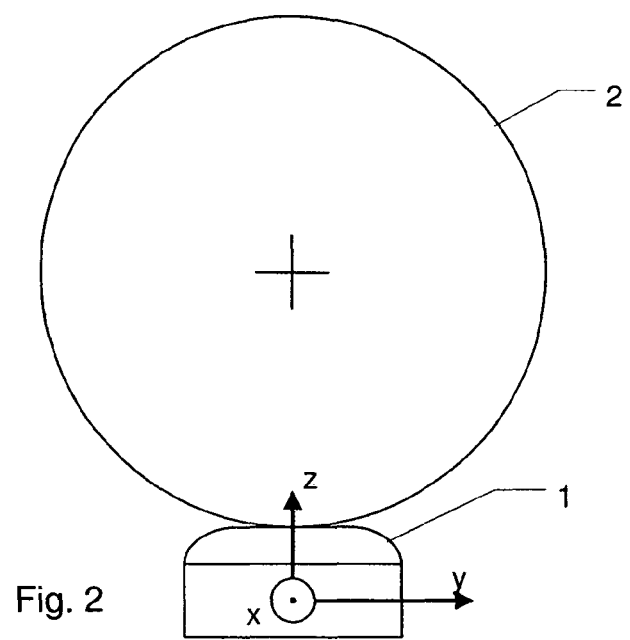
FIG. 2 shows a schematic plan view of the apparatus with the thickness measuring apparatus of FIG. 1.

FIG. 1 and FIG. 2 show a possible arrangement of a sensor 1 at a foil 2. FIG. 2 shows in the plan view the position of sensor 1 at the cylindrical part of a blown film 2. FIG. 1 shows in the front view the arrangement of a sensor 1 which can execute a vibration movement. Sensor 1 has a sensor surface which faces foil 2 and which can contact the same. The foil moves in the direction of production with the take-off speed va. This generally lies in a region of approximately 1 to 300 m/min., typical are approximately 50 m/min. The sensor is connected on a carrier plate 3 via a leaf spring 5 with the carrier system 6 such that a transverse vibration can take place in the y direction, respectively, around an axis parallel to the z direction through the midpoint M in the distance r1, r2. A vibrator 4, which, for example, can be an electromagnetic vibrator, a piezoelectrically driven device, or a device driven by the imbalance of a rotating part, imparts vibrations to the sensor. A suitable amplitude lies in the range of approximately 1 mm. A possible frequency is, for example, 50 Hz. Other vibration frequencies can also be suitable, according to the surface property of the foil and the friction ratios between the foil and the sensor surface.

If the vibration in the direction of z is executed transverse or rotating around an axis parallel to the direction of the y axis through point M in the distance r1, r2, then it is possible that the sensor only occasionally contacts the foil. If the vibration is executed in the y direction, then the contact pressure or the distance to the foil remains constant. Vibrations in the x direction vary the relative speed between foil and sensor.

If the vibration is executed as a rotation around an axis on the measuring head surface, then the contact pressure and/or the distance to the foil changes on all points of the sensor next to the axis.

The apparatus is suited to reduce the friction between two bodies 1, 2 moving relative to each other. The two bodies 1, 2, which move relative to each other, can contact each other constantly or occasionally or have a small distance from one another of, for example, up to one millimeter. The distance can vary. With the relative movement of both bodies 1, 2, for example, the one body can be a sensor 1 which is firmly installed, and the second body can be a foil 2, which moves with considerably constant speed. The device has a vibration device 3, 4, 5, 6 for vibrating at least one of the bodies 1, 2. The vibration movements of the vibrated bodies can have any pattern.

The invention claimed is:
1. A measuring apparatus for reducing friction between a measuring device and a foil moving relative to the measuring device and for measuring a thickness of the foil, the apparatus comprising a measuring device including a sensor having a sensor surface which contacts the moving foil at least occasionally, the moving foil comprising a non-conductive plastic foil, and the measuring surface at least occasionally contact- ing the moving foil, the measuring device including a vibration device which vibrates the entire sensor or only the sensor surface for reducing any friction that arises between the sensor surface and the moving foil.

2. The measuring apparatus according to claim 1 wherein vibrations in three-dimensional space and/or vibration frequencies and/or the vibration patterns of said vibration device can be selected.

3. The measuring apparatus according to claim 1 wherein the vibrations of said sensor and/or of said sensor surface take place at least approximately parallel to the surface of said moving foil.

4. The measuring apparatus according to claim 1 wherein said vibration device functions electromagnetically and/or piezoelectrically, or wherein the vibration is produced with an imbalance of a rotating part.

5. The measuring apparatus according to claim 1 wherein vibration parameters can be selected according to a required measuring precision and frictional conditions between the sensor surface and the surface of the moving foil, and/or the friction coefficients of the surface of the moving foil.

6. The measuring apparatus according to claim 1 wherein said sensor works optically, capacitively or with ionizing radiation.

7. A device for manufacturing plastic foils comprising a measuring apparatus according to claim 1, in which the sensor surface is a low-friction coated surface and said sensor contacts the surface of said moving foil or an air cushion between said moving foil and the sensor surface.

8. The measuring apparatus according to claim 1 wherein the vibration movements of the vibrating body can have any pattern.

9. The measuring apparatus according to claim 6 wherein the ionizing radiation is $\beta$ radiation or $\gamma$ radiation.

* * * * *